(12) United States Patent
Won (10) Patent No.: US 9,174,500 B2
(45) Date of Patent: Nov. 3, 2015

(54) TIRE PRESSURE MONITORING SYSTEM

(71) Applicant: SAMSUNG ELECTRONICS CO., LTD., Suwon-si (KR)

(72) Inventor: Jong-hwa Won, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 40 days.

(21) Appl. No.: 14/016,893

(22) Filed: Sep. 3, 2013

(65) Prior Publication Data

US 2014/0118134 A1    May 1, 2014

(30) Foreign Application Priority Data

Oct. 26, 2012 (KR) .................. 10-2012-0119807

(51) Int. Cl.
*B60C 23/00* (2006.01)
*B60C 23/04* (2006.01)

(52) U.S. Cl.
CPC ......... *B60C 23/0498* (2013.01); *B60C 23/0413* (2013.01)

(58) Field of Classification Search
CPC ............ B60C 23/0408; B60C 23/0433; B60C 23/0452; B60C 23/0493; B60C 23/0494; B60C 23/0413; B60C 23/0498
USPC ................................ 340/442, 443, 445, 447; 73/146.2–146.5
See application file for complete search history.

(56) References Cited

U.S. PATENT DOCUMENTS

| | | | |
|---|---|---|---|
| 6,838,985 B2 * | 1/2005 | Ghabra et al. | 340/445 |
| 7,161,476 B2 * | 1/2007 | Hardman et al. | 340/442 |
| 7,429,801 B2 * | 9/2008 | Adamson et al. | 310/328 |
| 7,518,493 B2 | 4/2009 | Bryzek et al. | |
| 2005/0231346 A1 * | 10/2005 | Ichinose et al. | 340/447 |
| 2006/0185429 A1 | 8/2006 | Liu et al. | |
| 2007/0013503 A1 * | 1/2007 | Chien et al. | 340/447 |
| 2007/0125161 A1 | 6/2007 | Bryzek et al. | |
| 2007/0256485 A1 * | 11/2007 | Rensel et al. | 340/447 |

(Continued)

FOREIGN PATENT DOCUMENTS

| | | |
|---|---|---|
| JP | 2005-164356 A | 6/2005 |
| JP | 2005-254900 A | 9/2005 |

(Continued)

OTHER PUBLICATIONS

Courbat, et al., "Inkjet Printing on Paper for the Realization of Humidity and Temperature Sensors", Transducers'11, T3P.089, Jun. 5-9, 2011, pp. 1356-1359.

(Continued)

*Primary Examiner* — Thomas Mullen
(74) *Attorney, Agent, or Firm* — Sughrue Mion, PLLC (57) ABSTRACT

A tire pressure monitoring system (TPMS) is provided. The TPMS includes: a plurality of sensors which output sensing signals, the plurality of sensors including a printable pressure sensor which senses an air pressure of a tire, and a temperature sensor which senses an air temperature inside the tire; a signal processor which is configured to process the sensing signals output by the plurality of sensors; a wireless power receiver which is configured to receive energy from a power source and output power; and a rechargeable battery which is configured to be charged by the power output by the wireless receiver and supply power to the plurality of sensors to sense the air pressure of the tire and the air temperature inside the tire.

26 Claims, 6 Drawing Sheets

(56) References Cited

U.S. PATENT DOCUMENTS

2009/0102633 A1* 4/2009 Ebinuma et al. ............. 340/442
2011/0074564 A1* 3/2011 Hirabayashi et al. ......... 340/447

FOREIGN PATENT DOCUMENTS

| JP | 2007-163230 A | 6/2007 |
|---|---|---|
| JP | 2007-256080 A | 10/2007 |
| JP | 2011-248903 A | 12/2011 |
| KR | 10-2006-0054112 A | 5/2006 |

OTHER PUBLICATIONS

Andre Kurs et al.; "Wireless Power Transfer via Strongly Coupled Magnetic Resonances"; Science AAAS; vol. 317; No. 83; Jul. 2007; DOI: 10.1126/science.1143254 (5 pages).

* cited by examiner

TIRE PRESSURE MONITORING SYSTEM

CROSS-REFERENCE TO RELATED APPLICATION

This application claims priority from Korean Patent Application No. 10-2012-0119807, filed on Oct. 26, 2012, in the Korean Intellectual Property Office, the disclosure of which is incorporated herein in its entirety by reference.

BACKGROUND

1. Field

Embodiments consistent with the present disclosure relate to a tire pressure monitoring system.

2. Description of the Related Art

Abnormalities in tire pressure may cause a significant vehicle accident, such as a burst of a tire due to abnormal wear or heat generation on both sides of a tire tread, a decrease in handling stability, deterioration of gas mileage, or an occurrence of hydroplaning at a low driving speed. Therefore, monitoring a tire pressure is important in order to secure stability of a vehicle.

A tire pressure monitoring system (TPMS) is a device that informs a driver or another device of a vehicle of air pressures of tires, i.e., tire pressure. The TPMS helps to prevent insufficient tire pressure, or tire damage, from causing an accident and inefficient gas mileage.

SUMMARY

Embodiments provide a tire pressure monitoring system that is inexpensive, simple to install, and easy to maintain.

Additional aspects of the exemplary embodiments will be set forth in part in the description which follows and, in part, will be apparent from the description, or may be learned by practice of the presented embodiments.

According to an aspect of an embodiment, there is provided a tire pressure monitoring system including: a plurality of sensors which output sensing signals, the plurality of sensors including a printable pressure sensor which senses an air pressure of a tire, and a temperature sensor which senses an air temperature inside the tire; a signal processor which is configured to process the sensing signals output by the plurality of sensors; a wireless power receiver which is configured to receive energy from a power source and output power; and a rechargeable battery which is configured to be charged by the power output by the wireless power receiver and supply power to the plurality of sensors power to sense the air pressure of the tire and the air temperature inside the tire.

The printable pressure sensor may be configured to sense the air pressure of the tire by measuring a resistance or capacitance, according to a transformation of a space between two films due to a pressure of a tire dorsal part.

The space between the two films may be in a vacuum state, or is filled with a gaseous, liquid, or solid material.

The temperature sensor may include a structure in which a heat sensing part is stacked, trenched, or embedded with respect to a flexible substrate.

The heat sensing part may be configured to measure the temperature by coating heat sensing resistive particles in order to utilize a phenomenon in which a resistance increases according to the temperature.

The heat sensing resistive particles may include silver nanoparticles.

The heat sensing part may be configured to measure the temperature using a material having pyroelectricity in order to measure a voltage generated according to the temperature.

The material having pyroelectricity may include a Polyvinylidene Fluoride (PVDF).

The signal processor may include a circuit formed by printed electronics technology on a substrate formed of a polymer material, a flexible substrate, or a substrate of a complex structure of a solid substrate part and a flexible substrate part.

The wireless power receiver may include a resonance coil formed on a flexible substrate by a printed electronics method, coating, or electrolytic plating.

The flexible substrate may wind around a tire rim, and a pattern of the resonance coil is formed on the flexible substrate and connects both ends of a coil pattern of the resonance coil to each other to conduct electricity.

The both ends of the coil pattern may be connected to each other to conduct electricity by using a soldering, buttoning, or plugging method.

An antenna structure may be provided on one side of the flexible substrate by the printed electronics method, the antenna structure is configured to transmit the processed signals output by the signal processor.

At least one selected from a group consisting of the plurality of sensors, the signal processor, and the rechargeable battery may be provided on the flexible substrate by a printed electronics method.

At least one selected from a group consisting of the plurality of sensors, the signal processor, and the rechargeable battery may be provided on the flexible substrate in a chip on board (COB) form.

At least one selected from a group consisting of the plurality of sensors, the signal processor, and the rechargeable battery may be assembled on the flexible substrate.

The rechargeable battery may repeatedly rechargeable.

The rechargeable battery may be formed by a printed electronics method.

The rechargeable battery may be formed in a lithium-polymer or lithium-ion thin film structure.

According to an aspect of another embodiment, there is provided a tire pressure monitoring system mounted on a tire rim, the tire pressure monitor system including: a flexible substrate which is mounted on the tire rim; and the tire pressure including a sensor device which outputs sensing signals, the sensor device senses an air pressure of a tire and an air temperature of the tire; a signal processor which is configured to process signals output by the sensor device; a wireless power receive which is configured to receive energy from a power source and output power; and a rechargeable battery which is configured to be recharged by the power output by the wireless power receive and supply power to the plurality of sensor to sense the air pressure of the tire and the air temperature inside the tire.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

A tire pressure monitoring system (TPMS) according to embodiments will now be described in detail with reference to the accompanying drawings, wherein like reference numerals refer to like elements throughout the drawings, and sizes and thicknesses of components in the drawings may be exaggerated for clarity and convenience of description. In this regard, the present embodiments may have different forms and should not be construed as being limited to the descriptions set forth herein. Accordingly, the embodiments are merely described below, by referring to the figures, to explain aspects of the present description. As used herein, expressions such as "at least one of," when preceding a list of elements, modify the entire list of elements and do not modify the individual elements of the list.

Figure 1:
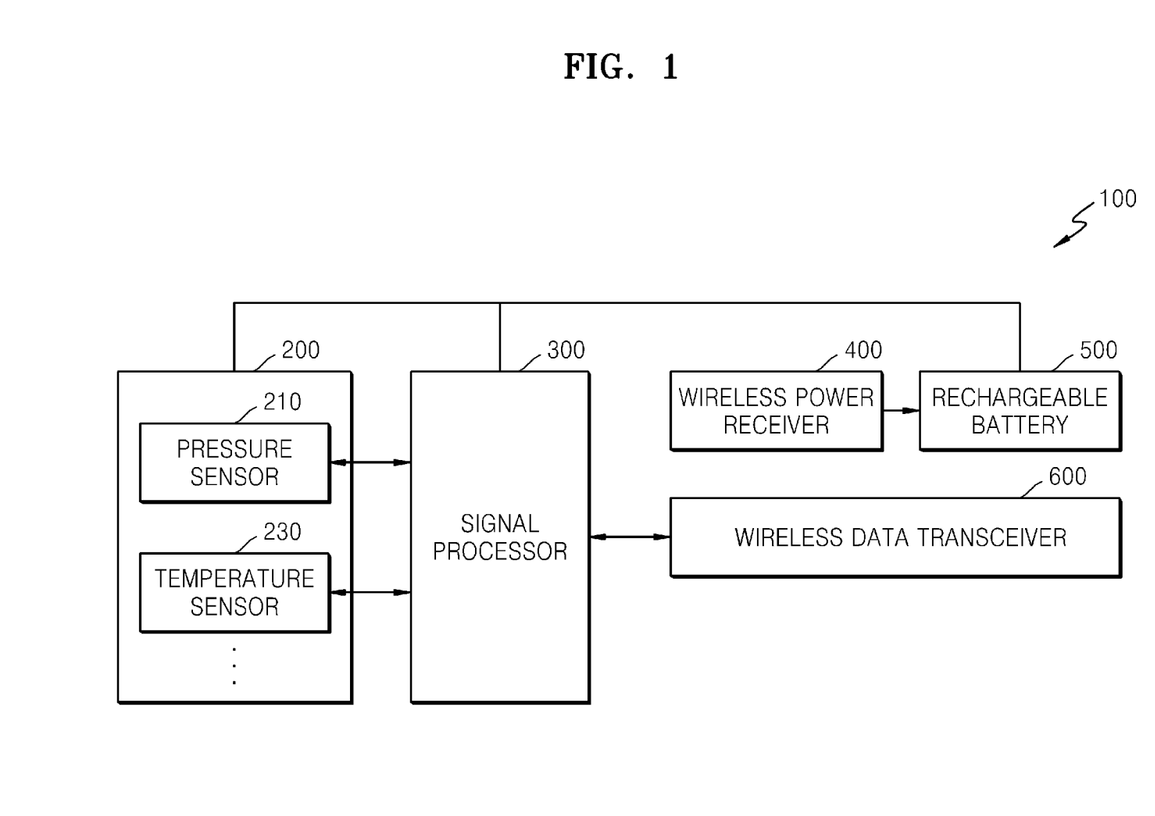
FIG. 1 is a block diagram of major configurations of a tire pressure monitoring system (TPMS), according to an embodiment.

FIG. 1 is a block diagram of major configurations of a TPMS 100, according to an embodiment.

Referring to FIG. 1, the TPMS 100 includes a sensor unit 200, a signal processor 300, a wireless power receiver 400, a wireless data transceiver 600, and a rechargeable battery 500.

The sensor unit 200 includes a plurality of sensors. For example, the sensor unit 200 may include a printable pressure sensor 210 for sensing an air pressure of a tire, and a temperature sensor 230 for sensing an air temperature inside the tire. The sensor unit 200 may further include various sensors, such as an acceleration sensor for sensing acceleration.

The printable pressure sensor 210 measures an air pressure inside the tire, and may sense the air pressure by measuring a resistance or capacitance according to a transformation of a space 212 between two films 211 and 213, as shown in FIGS. 2A to 3C.

Figure 2A:
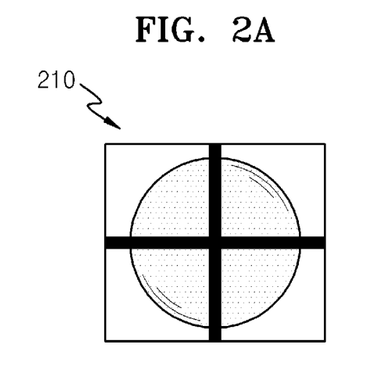
FIG. 2A is a top view of a printable pressure sensor applicable to a TPMS according to an embodiment.
Figure 2B:
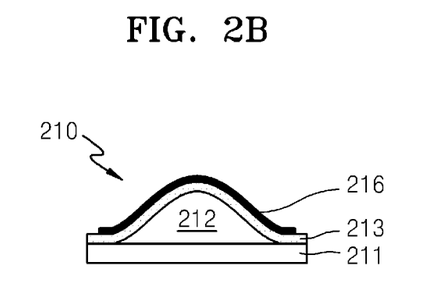
FIG. 2B is a side cross-sectional view of the printable pressure sensor of FIG. 2A.

FIG. 2A is a top view of the printable pressure sensor 210 applicable to the TPMS 100. FIG. 2B is a side cross-sectional view of the printable pressure sensor 210 of FIG. 2A.

Referring to FIGS. 2A and 2B, the printable pressure sensor 210 may have a structure in which a resistance varies according to a transformation. Therefore, the printable pressure sensor 210 may detect the transformation of the space 212 between the two films 211 and 213 by an air pressure of a tire. In other words, the space 212 may be formed between the two films 211 and 213 by forming a structure in which a partial area of one film 213 is expanded against the other film 211. The film 213, having the expanded structure of the two films 211 and 213, may be formed of a flexible material to cause a transformation in the space 212 in response to the air pressure of the tire. Accordingly, a resistance, of a resistance change material pattern 216 formed on the film 213, may vary. In this case, the space 212 may be in a vacuum state, or be filled with a gaseous, liquid, or solid material. When a resistance value varies according to a transformation in the space 212 of the printable pressure sensor 210 due to the air pressure of the tire, a transformation amount may be detected, and an air pressure may be determined from the detected transformation amount.

It may be determined whether the space 212 is in a vacuum state or is filled with a gaseous, liquid, or solid material according to a pressure inside the tire, and the thicknesses of the films 211 and 213.

Figure 3A:
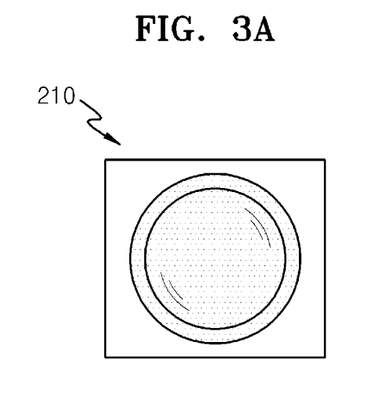
FIG. 3A is a top view of a printable pressure sensor applicable to a TPMS according to another embodiment.
Figure 3B:
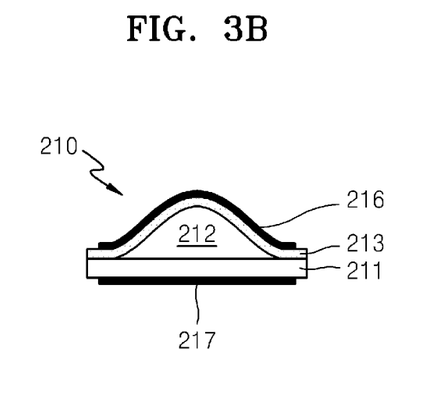
FIG. 3B is a side cross-sectional view of the printable pressure sensor of FIG. 3A, wherein upper and lower electrodes are formed on outer surfaces of two films.
Figure 3C:
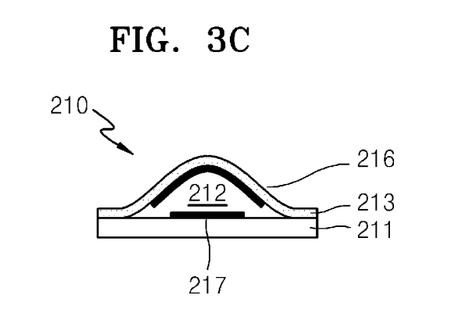
FIG. 3C is a side cross-sectional view of the printable pressure sensor of FIG. 3A, wherein upper and lower electrodes are formed on inner surfaces of two films.

FIG. 3A is a top view of the printable pressure sensor 210 applicable to the TPMS 100 according to an embodiment. FIGS. 3B and 3C are side cross-sectional views of the printable pressure sensor 210 of FIG. 3A. FIG. 3B shows a case where upper and lower electrodes 216 and 217 are formed on the outer surfaces of the two films 211 and 213, and FIG. 3C shows a case where upper and lower electrodes 216 and 217 are formed on inner surfaces of the two films 211 and 213. Referring to FIGS. 3A to 3C, compared with the printable pressure sensor 210 of FIGS. 2A and 2B, the printable pressure sensor 210 of FIGS. 3A to 3C may be provided to sense an air pressure by measuring a capacitance, instead of the resistance change, according to the transformation of the space 212 between the two films 211 and 213 due to the air pressure of the tire.

In other words, the printable pressure sensor 210 may sense a transformation amount by forming the upper and lower electrodes 216 and 217 on the outer surfaces or inner surfaces of the two films 211 and 213, or forming one of the upper and lower electrodes 216 and 217 on the outer surface of one of the two films 211 and 213 and the other one of the upper and lower electrodes 216 and 217 on the inner surface of the other one of the two films 211 and 213 to measure a variation of capacitance according to the transformation of the space 212, instead of the resistance change material pattern 216. An air pressure may be measured from the transformation amount. In this case, the measurement of the capacitance may be readout as a change in a voltage, detection of a current, or a predetermined change in a frequency.

Although FIGS. 2A to 3C show one sensor region of the printable pressure sensor 210, the printable pressure sensor 210 may also include a two-dimensional array of such sensor regions.

Figure 4:
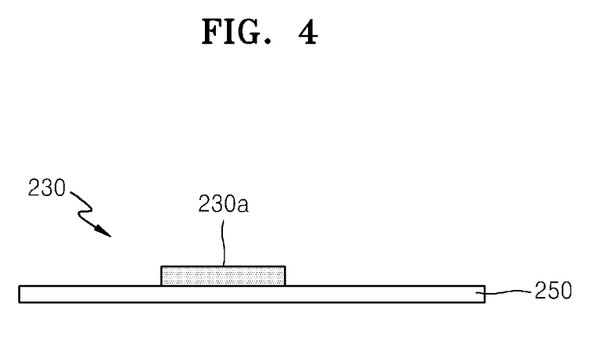
FIG. 4 is a front view of a temperature sensor applicable to a TPMS according to an embodiment.

Referring to FIG. 4, in the TPMS 100, the temperature sensor 230 measures an air temperature inside the tire. The temperature sensor 230 may be formed, for example, with a structure in which a heat sensing part 230a is stacked, trenched, or embedded with respect to a flexible substrate 250. FIG. 4 is a front view of the temperature sensor 230 applicable to the TPMS 100 according to an embodiment. FIG. 4 illustrates an exemplary structure in which the heat sensing part 230a is stacked on the flexible substrate 250. A protection layer or a conductive layer, having a good heat conductivity, may be further included on the heat sensing part 230*a*.

The heat sensing part 230*a* may measure a temperature by coating heat sensing resistive particles on the flexible substrate 250. The heat sensing part 230*a* may measure the temperature in order to use a phenomenon in which a resistance increases according to a temperature. The heat sensing resistive particles may include, e.g., silver nanoparticles.

As another example, the heat sensing part 230*a* may measure a temperature using a material having pyroelectricity. In this case, the heat sensing part 230*a* may measure a voltage generated according to a temperature. The material having pyroelectricity may include a PVDF Polyvinylidene-fluoride).

Figure 5A:
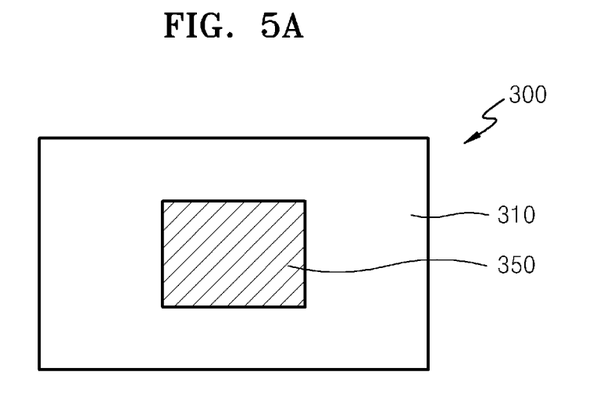
FIG. 5A is a top view of an example in which a circuit of a signal processor is arranged on a substrate when the substrate is formed of polymer materials to which printed electronics technology is applicable or is a flexible substrate.
Figure 5B:
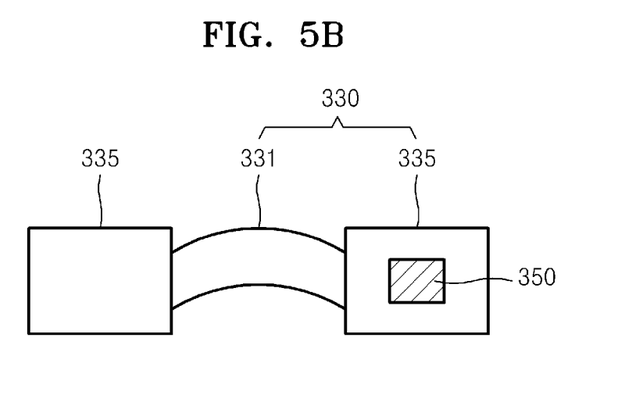
FIG. 5B illustrates an example in which a circuit of a signal processor is arranged on a substrate when the substrate has a complex structure of a solid substrate part and a flexible substrate part.

Referring to FIGS. 5A and 5B, in the TPMS 100, the signal processor 300 includes a circuit 350 for processing signals detected by the plurality of sensors including the printable pressure sensor 210 and the temperature sensor 230. The circuit 350 may be formed on substrates 310 and 330 by printed electronics technology. FIGS. 5A and 5B show cases where the circuit 350 of the signal processor 300 is formed on the substrates 310 and 330. FIG. 5A shows an example in which the circuit 350 is arranged on the substrate 310, when the substrate 310 is formed of polymer materials to which the printed electronics technology is applicable or is a flexible substrate. FIG. 5B shows an example in which the circuit 350 is arranged on the substrate 330, when the substrate 330 has a complex structure of a solid substrate part 335 and a flexible substrate part 331. In FIGS. 5A and 5B, the substrates 310 and 330 may be a printed circuit board (PCB) formed of all types of polymer materials, formed of a flexible material, or having a complex structure of a solid substrate part and a flexible substrate part.

The TPMS 100 may include the wireless power receiver 400 for wirelessly transmitting power to supply sufficient power in order to continuously observe an air pressure and a temperature. The TPMS 100 may also include the wireless data transceiver 600 for transmitting measured data, processed data, etc.

Figure 6:
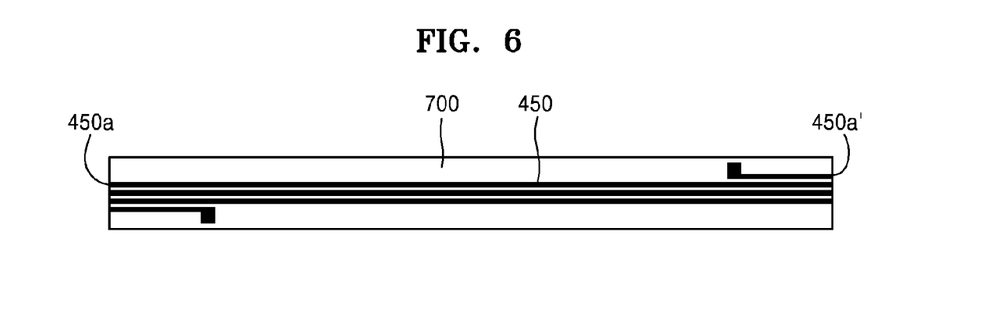
FIGS. 6 and 7 illustrate examples in which a resonance coil applicable as a wireless power receiver to a TPMS according to embodiments is implemented on a flexible substrate.
Figure 7:
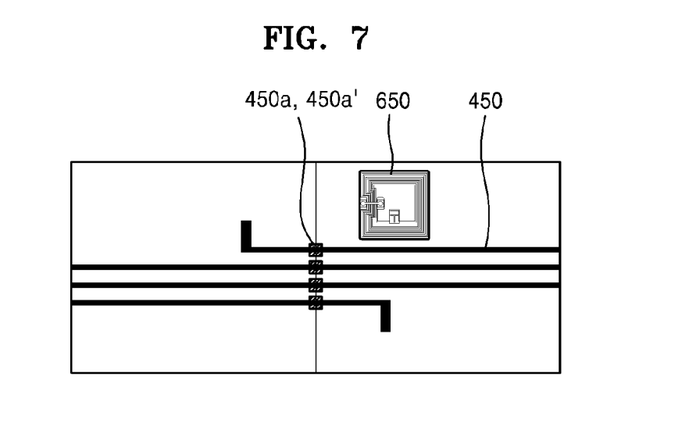

The TPMS 100 may have a structure implemented by print technology. As shown in FIGS. 6 and 7, the TPMS 100 may implement print technology by integrating a structure of a resonance coil 450 and a structure of a wireless communication antenna 650, for transmitting the measured data and processed data on a flexible substrate 700.

In the TPMS 100, the wireless power receiver 400 may include the resonance coil 450. The TPMS 100 is, for example, mounted on a tire rim. As shown in FIGS. 6 and 7, the resonance coil 450 may be implemented on the flexible substrate 700. The resonance coil 450 on the flexible substrate 700 may be formed by printed electronics technology, and other methods, such as coating or electrolytic plating. As shown in FIGS. 6 and 7, the resonance coil 450 may be formed by winding the flexible substrate 700, on which a pattern of the resonance coil 450 is formed, around the tire rim and connecting both ends 450*a* of the pattern of the resonance coil 450 to each other to conduct electricity. In this case, the both ends 450*a* of the pattern of the resonance coil 450 may be connected to each other to conduct electricity by using a soldering method.

Figure 8:
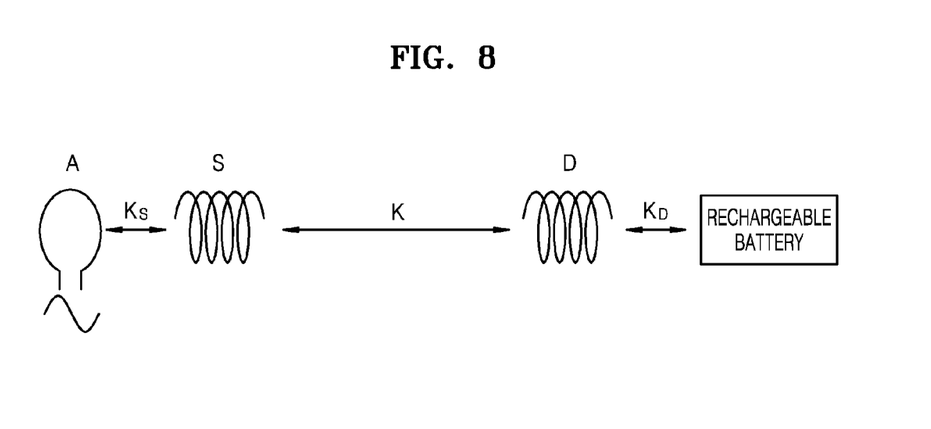
FIG. 8 is a schematic diagram of wireless power transmission.

FIG. 8 is a schematic diagram of wireless power transmission. In FIG. 8, S denotes a coil for wirelessly transmitting power of a power supply source A, and D denotes the resonance coil 450. Power wirelessly transmitted through the resonance coil 450 is charged in the rechargeable battery 500, thereby supplying sufficient power to monitor a tire pressure.

A wireless power transmission distance may be valid up to tens of cm, with a power efficiency of tens of percentage points.

As shown in FIG. 7, the wireless data transceiver 600 for transmitting measured data and processed data, the wireless communication antenna 650 for transmitting data and receiving data, which is formed at an arbitrary location in a printed electronics method, may be included. The wireless data transceiver 600 may further include a modem (refer to 670 of FIG. 11), in addition to the wireless communication antenna 650 for transmitting data and receiving data.

The TPMS 100 may further include the rechargeable battery 500 together with a wireless power transmission device, to supply sufficient power to monitor a tire pressure. The rechargeable battery 500 may be flexibly formed by a printed electronics method, together with the wireless power transmission device, i.e., the resonance coil 450. When the rechargeable battery 500 is used, it may be possible to monitor an air pressure at a high performance by only wirelessly charging once for several weeks or months. The rechargeable battery 500 may be repeatedly recharged.

Figure 9:
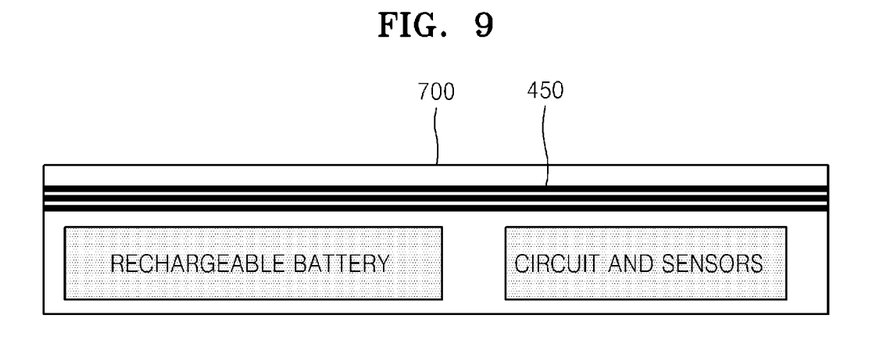
FIG. 9 illustrates an example in which a printable and rechargeable flexible battery is formed together with other components.

FIG. 9 shows an example in which a printable and rechargeable flexible battery is formed together, with other components. In this case, the printable and rechargeable flexible battery may be printed, coated, or embedded, and may be formed in a lithium-polymer or lithium-ion thin film structure.

FIG. 9 shows an example in which the rechargeable battery 500, the circuit 350 of the signal processor 300, and sensors, including the printable pressure sensor 210 and the temperature sensor 230, are printed and formed on the flexible substrate 700, on which the pattern of the resonance coil 450 is formed.

Figure 10:
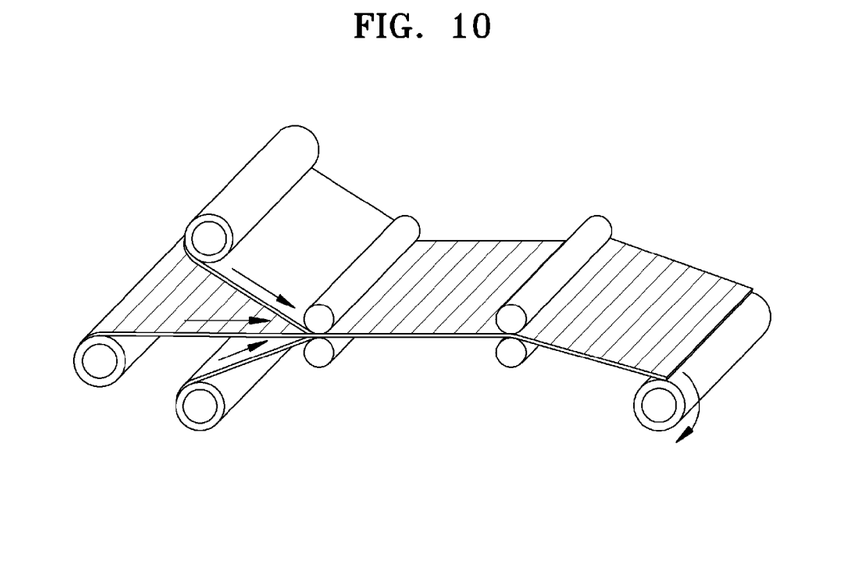
FIG. 10 illustrates an example of a roll-to-roll method.

The TPMS 100 may be formed using a roll-to-roll method, an assembly method, etc., based on a printed electronics method, and may be mounted on a tire rim. FIG. 10 illustrates an example of the roll-to-roll method.

A method of manufacturing the TPMS 100 is not limited to a printed electronics method. All methods, such as coating, plating, deposition, etching, etc., may be used as long as the methods deal with a flexible substrate. Also, a mounting place is not limited to a tire rim. The TPMS 100 may also be formed as a tire side wall attachment type or a valve type.

In addition, the types of applied sensors are not limited to the printable pressure sensor 210 and the temperature sensor 230. Therefore, other types of applied sensors may be applied as necessary, including an acceleration sensor, a humidity sensor, etc.

Figure 11:
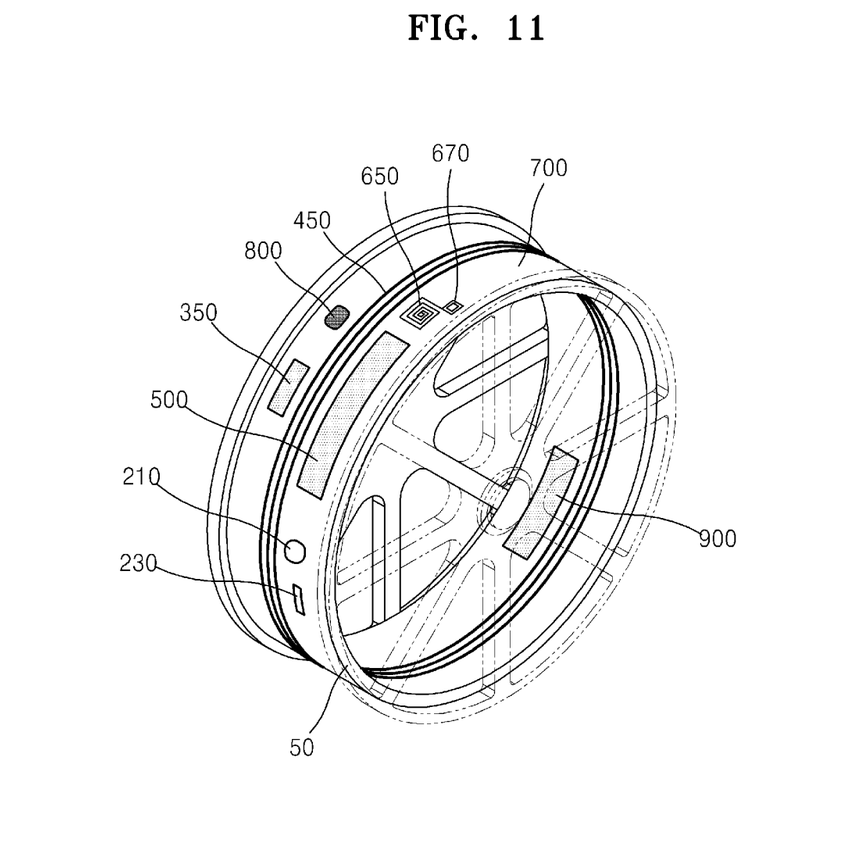
FIG. 11 is a perspective view of a tire rim on which a TPMS according to an embodiment is mounted.

FIG. 11 is a perspective view of a tire rim 50, on which the TPMS 100 is mounted, according to an embodiment. Like reference numerals denote like components.

Referring to FIG. 11, the TPMS 100 has a structure in which the sensor unit 200, including the printable pressure sensor 210 and the temperature sensor 230, the circuit 350 forming the signal processor 300, the rechargeable battery 500, the resonance coil 450 forming the wireless power receiver 400, the wireless communication antenna 650 and a modem 670 forming the wireless data transceiver 600, etc., are arranged on the flexible substrate 700. The flexible substrate 700, on which these components are arranged, may be mounted on the tire rim 50. Various chips 800, such as a memory, a security chip, etc., may be further arranged on the flexible substrate 700 in a chip on board (COB) form. Another PCB 900 may be arranged in another area of the flexible substrate 700. In addition, the sensor unit 200, including the printable pressure sensor 210 and the temperature sensor 230, the circuit 350, and the rechargeable battery 500 may be arranged at a plurality of locations.

The components may be directly printed on the surface of the tire rim 50, monolithically provided on the flexible substrate 700, provided in a COB form on the flexible substrate 700, or provided in an additionally assembled form.

At least one selected from the group consisting of the plurality of sensors including the printable pressure sensor 210 and the temperature sensor 230, the circuit 350, and the rechargeable battery 500 may be formed on the flexible substrate 700 by a printed electronics method.

At least one selected from the group consisting of the plurality of sensors including the printable pressure sensor 210 and the temperature sensor 230, the circuit 350, and the rechargeable battery 500 may be formed on the flexible substrate 700 in a COB form.

At least one selected from the group consisting of the plurality of sensors including the printable pressure sensor 210 and the temperature sensor 230, the circuit 350, and the rechargeable battery 500 may be assembled on the flexible substrate 700.

In addition, the TPMS 100, including necessary sensors, a signal processing circuit, the rechargeable battery 500, the resonance coil 450 for wireless power transmission, and the wireless communication antenna 650 for data transmission and reception on the flexible substrate 700, may be manufactured by the roll-to-roll method. Therefore, the TPMS 100 is cheap, easy to mount, and easy to maintain.

In addition, since it is necessary to charge the rechargeable battery 500 with power through the wireless power receiver 400 once, for several months or several weeks, a wireless power transmission system may be provided in a vehicle or mounted at a location other than a vehicle.

As described above, according to the one or more of the above embodiments, a cheap, easy to mount, and easy to maintain TPMS may be implemented by providing necessary sensors, a signal processing circuit, a rechargeable battery, a wireless power transmission resonance coil, and a data transmission and reception antenna on a flexible substrate in a monolithic manner, in a COB form, or in an additionally assembled form.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A tire pressure monitoring system comprising:
   a plurality of sensors which output sensing signals, the plurality of sensors including a printable pressure sensor which senses an air pressure of a tire, and a temperature sensor which senses an air temperature inside the tire;
   a signal processor which is configured to process the sensing signals output by the plurality of sensors;
   a wireless power receiver which is configured to wirelessly receive power transmitted from a power supply source, convert the received power to charging power and output the charging power; and
   a rechargeable battery which is configured to be charged by the charging power output by the wireless power receiver and supply power to the plurality of sensors to sense the air pressure of the tire and the air temperature inside the tire.

2. The tire pressure monitoring system of claim 1, wherein the printable pressure sensor comprises two films and is configured to sense the air pressure of the tire by measuring a resistance or capacitance, according to a transformation of a space between the two films due to the air pressure of the tire.

3. The tire pressure monitoring system of claim 2, wherein the space between the two films is in a vacuum state, or is filled with a gaseous, liquid, or solid material.

4. The tire pressure monitoring system of claim 1, wherein the temperature sensor includes a structure in which a heat sensing part is stacked, trenched, or embedded with respect to a flexible substrate.

5. The tire pressure monitoring system of claim 4, wherein the heat sensing part comprises heat sensing resistive particles coated on the flexible substrate.

6. The tire pressure monitoring system of claim 5, wherein the heat sensing resistive particles include silver nanoparticles.

7. The tire pressure monitoring system of claim 4, wherein the heat sensing part is configured to measure the temperature using a material having pyroelectricity in order to measure a voltage generated according to the temperature.

8. The tire pressure monitoring system of claim 7, wherein the material having pyroelectricity includes a Polyvinylidene Fluoride (PVDF).

9. The tire pressure monitoring system of claim 1, wherein the signal processor comprises a circuit formed by printed electronics technology on a substrate formed of a polymer material, a flexible substrate, or a substrate of a complex structure of a solid substrate part and a flexible substrate part.

10. The tire pressure monitoring system of claim 1, wherein the wireless power receiver comprises a resonance coil which is formed in a pattern on a flexible substrate by a printed electronics method, coating, or electrolytic plating.

11. The tire pressure monitoring system of claim 10, wherein the flexible substrate winds around a tire rim, and both ends of the pattern of the resonance coil formed on the flexible substrate are connected to each other to conduct electricity.

12. The tire pressure monitoring system of claim 11, wherein the ends of the pattern of the resonance coil are connected to each other to conduct electricity by soldering.

13. The tire pressure monitoring system of claim 10, further comprising an antenna structure which is provided on one side of the flexible substrate by the printed electronics method, the antenna structure is configured to transmit the processed signals output by the signal processor.

14. The tire pressure monitoring system of claim 1, wherein at least one selected from a group consisting of the plurality of sensors, the signal processor, and the rechargeable battery is provided on a flexible substrate by a printed electronics method.

15. The tire pressure monitoring system of claim 1, wherein at least one selected from a group consisting of the plurality of sensors, the signal processor, and the rechargeable battery is provided on a flexible substrate in a chip on board (COB) form.

16. The tire pressure monitoring system of claim 1, wherein at least one selected from a group consisting of the plurality of sensors, the signal processor, and the rechargeable battery is assembled on a flexible substrate.

17. The tire pressure monitoring system of claim 1, wherein the rechargeable battery is repeatedly rechargeable.

18. The tire pressure monitoring system of claim 1, wherein the rechargeable battery is formed by a printed electronics method.

19. The tire pressure monitoring system of claim 1, wherein the rechargeable battery is formed in a lithium-polymer or lithium-ion thin film structure.

20. A tire pressure monitoring system mounted on a tire rim, the tire pressure monitoring system comprising:
- a flexible substrate which is mounted on the tire rim;
- a sensor device which outputs sensing signals, the sensor device senses an air pressure of a tire and an air temperature of the tire;
- a signal processor which is configured to process the sensing signals output by the sensor device;
- a wireless power receiver which is configured to wirelessly receive power transmitted from a power supply source, convert the received power to recharging power and output the recharging power; and
- a rechargeable battery which is configured to be charged by the recharging power output by the wireless power receiver and supply power to the plurality of sensors to sense the air pressure of the tire and the air temperature inside the tire,
- wherein at least one of the sensor device, the signal processor, the wireless power receiver and the rechargeable battery is provided on the flexible substrate.

21. The tire pressure monitoring system of claim 20, wherein the tire pressure monitoring system further comprises:
- at least one of a memory and a security chip arranged on the flexible substrate in a chip on board (COB) form; and
- a wireless data transceiver which includes a modem.

22. The tire pressure monitoring system of claim 20, wherein the sensor device comprises:
- a printable pressure sensor which senses the air pressure of the tire; and
- a temperature sensor which senses the air temperature inside the tire.

23. The tire pressure monitoring system of claim 22, wherein the printable pressure sensor is configured to sense the air pressure by measuring a resistance or capacitance according to a transformation of a space between two films due to the air pressure of the tire.

24. The tire pressure monitoring system of claim 20, wherein the wireless power receiver comprises a resonance coil.

25. The tire pressure monitoring system of claim 24, wherein a pattern of the resonance coil is formed on the flexible substrate, and the flexible substrate winds around the tire rim.

26. The tire pressure monitoring system of claim 20, wherein the rechargeable battery is repeatedly rechargeable.

* * * * *